(12) United States Patent
Yoshida et al.

(10) Patent No.: US 10,493,847 B2
(45) Date of Patent: Dec. 3, 2019

(54) DECORATION PANEL

(71) Applicant: ALPINE ELECTRONICS, INC., Tokyo (JP)

(72) Inventors: Yusuke Yoshida, Iwaki (JP); Shigeyuki Oshima, Iwaki (JP); Satoru Aimi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 16/141,041

(22) Filed: Sep. 25, 2018

(65) Prior Publication Data
US 2019/0152320 A1 May 23, 2019

(30) Foreign Application Priority Data
Nov. 17, 2017 (JP) .................. 2017-221457

(51) Int. Cl.
*B60K 35/00* (2006.01)
*H01H 13/14* (2006.01)

(52) U.S. Cl.
CPC ............. *B60K 35/00* (2013.01); *H01H 13/14* (2013.01); *B60K 2370/141* (2019.05); *B60K 2370/155* (2019.05); *B60K 2370/1531* (2019.05); *B60K 2370/27* (2019.05); *B60K 2370/339* (2019.05)

(58) Field of Classification Search
None
See application file for complete search history.

(56) References Cited

U.S. PATENT DOCUMENTS

2008/0315767 A1* 12/2008 Kawanami ............... H01J 11/12
313/584

FOREIGN PATENT DOCUMENTS

JP 2002-367468 A 12/2002

* cited by examiner

*Primary Examiner* — John F Mortell
(74) *Attorney, Agent, or Firm* — Brinks Gilson & Lione

(57) ABSTRACT

A decoration panel used as an operation button includes a decoration section between a front translucent member and a rear translucent member, and the decoration section includes a counter reflection layer superposed on a rear face of a light-shield layer. A rear reflection layer is provided between the rear translucent member and a translucent member for illumination. The decoration section is displayed as if floating at an intermediate position in a depth direction. In addition, a surface of the decoration section oriented to the rear side constitutes a counter reflection surface.

11 Claims, 7 Drawing Sheets

DECORATION PANEL

RELATED APPLICATIONS

The present application claims priority to Japanese Patent Application Number 2017-221457, filed Nov. 17, 2017, the entirety of which is hereby incorporated by reference.

BACKGROUND

1. Field

The present disclosure relates to a decoration panel to be incorporated in an in-vehicle operation device, for example for use as a press-button section for operating a switch mechanism.

2. Description of the Related Art

Japanese Unexamined Patent Application Publication No. 2002-367468 discloses an invention related to a keytop plate.

The keytop plate shown in FIG. 3 of the cited document includes a keytop formed of a thermoplastic and transparent material. A first film plate is provided on the upper side of the keytop, and a second film plate is provided on the lower side of the keytop. The first film plate includes a printed layer formed thereon, exhibiting characters and patterns or marks. A vapor deposition layer is formed substantially over the entirety of the second film plate. The vapor deposition layer is formed of aluminum, nickel, titanium, or chrome, so as to present a metallic color.

According to paragraph [0029] of the cited document, a switch contact is turned on by pressing the keytop. In addition, a light emitter is provided on the lower side of the keytop plate, so that when the light from the light emitter reaches the keytop plate, the printed layer formed on the surface of the keytop is clearly and brightly illuminated. Further, since the vapor deposition layer is provided on the lower side of the keytop, the printed layer looks, in a view from above, like integrally floating on the vapor deposition layer, with a transparent appearance, so that a three-dimensional appearance and a luxurious feel can be achieved.

The keytop plate according to the document cited above has a drawback in that, since the vapor deposition layer is provided on the lower side of the keytop, which is transparent, the printed layer exhibiting the characters and patterns or marks on the upper side of the keytop may be reflected in the vapor deposition layer located on the lower side. Although the image looks fine when the keytop plate is viewed from right above the printed layer, when the keytop plate is viewed from an obliquely upper position, the image of the printed layer reflected in the vapor deposition layer, and the printed layer itself, are seen as double vision. Therefore, it becomes difficult to identify the characters and patterns or marks exhibited by the printed layer, which results in an impaired three-dimensional appearance and luxurious feel.

BRIEF SUMMARY

The present disclosure is made in view of the foregoing, and provides a decoration panel configured to display a decoration section provided in a front translucent member as a three-dimensionally floating image, and prevent the decoration section from being seen as double vision.

In one aspect, the present disclosure provides a decoration panel including a front translucent member formed of a translucent material and located on a front side, and a decoration section provided in the front translucent member. The decoration panel also includes a rear reflection surface located on a rear side of the decoration section having a distance therefrom.

A surface of the decoration section opposing at least the rear reflection surface constitutes a counter reflection surface, and the rear reflection surface and the counter reflection surface are mirror reflection surfaces.

In the foregoing decoration panel, preferably, a rear translucent member formed of a translucent material may be stacked on a rear face of the front translucent member, and the rear reflection surface may be provided on a rear face of the rear translucent member.

In the foregoing decoration panel, however, a space may be provided between the rear face of the front translucent member and the rear reflection surface.

In the foregoing decoration panel, preferably, the decoration section may be provided on the rear face of the front translucent member.

In the foregoing decoration panel, preferably, the decoration section may be provided on a front face of the front translucent member, and the rear reflection surface may be provided on the rear face of the front translucent member.

In the foregoing decoration panel, preferably, the decoration section may include a light-shield layer, and a counter reflection layer superposed on a rear side of the light-shield layer, and the counter reflection surface may be formed in the counter reflection layer.

In this case, it is preferable that the light-shield layer and the counter reflection layer superposed on the rear side of the light-shield layer are the same in plan-view shape and in size. However, the counter reflection surface superposed on the rear side of the light-shield layer may be larger in area than the light-shield layer.

In the foregoing decoration panel, preferably, the decoration section may only include the counter reflection layer, and the counter reflection surface may be formed in the counter reflection layer.

Preferably, the rear reflection surface may be a half mirror, and the decoration panel may include an illumination unit configured to provide an illumination light to the half mirror, from a rear side.

Preferably, the foregoing decoration panel may further include a switch mechanism configured to be activated when the front translucent member is pressed.

In the decoration panel configured as above, the decoration section is provided on the front face or rear face of the front translucent member, or between the front face and the rear face, and the rear reflection surface is provided on the rear side of the decoration section, having a distance therefrom. Therefore, the decoration section looks as if it is floating on the front side of the rear reflection surface, and the characters and patterns or marks exhibited in the decoration section can be displayed as three-dimensional images.

Further, the surface of the decoration section opposing at least the rear reflection surface constitutes the counter reflection surface, and the rear reflection surface and the counter reflection surface are both mirror reflection surfaces. Such a configuration restricts the decoration section, which is located on the front side, from being reflected in the rear reflection surface, thereby preventing the decoration section from being seen as double vision.

DETAILED DESCRIPTION

Figure 1:
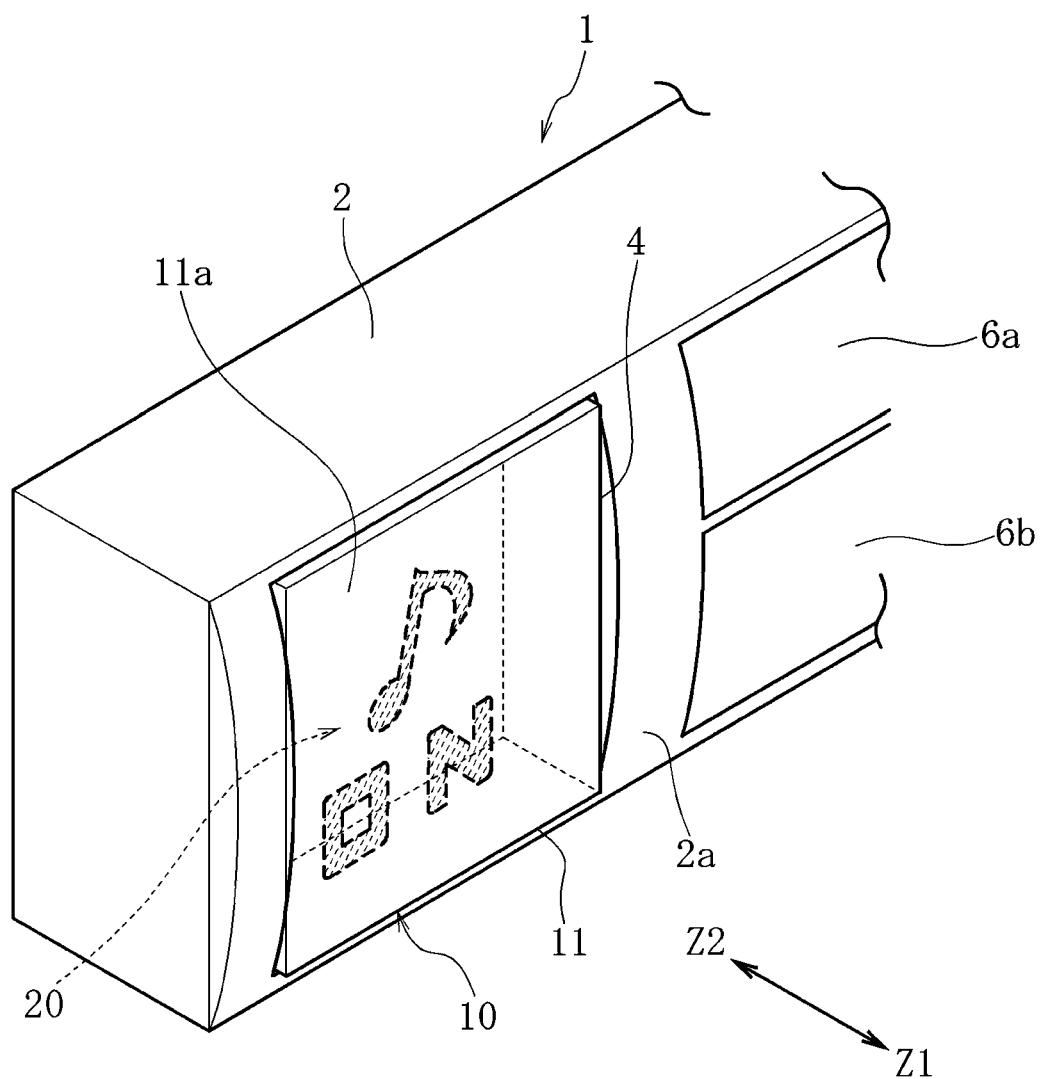
FIG. 1 is a perspective view showing a part of an operation device including a decoration panel according to a first embodiment of the present disclosure.
Figure 2:
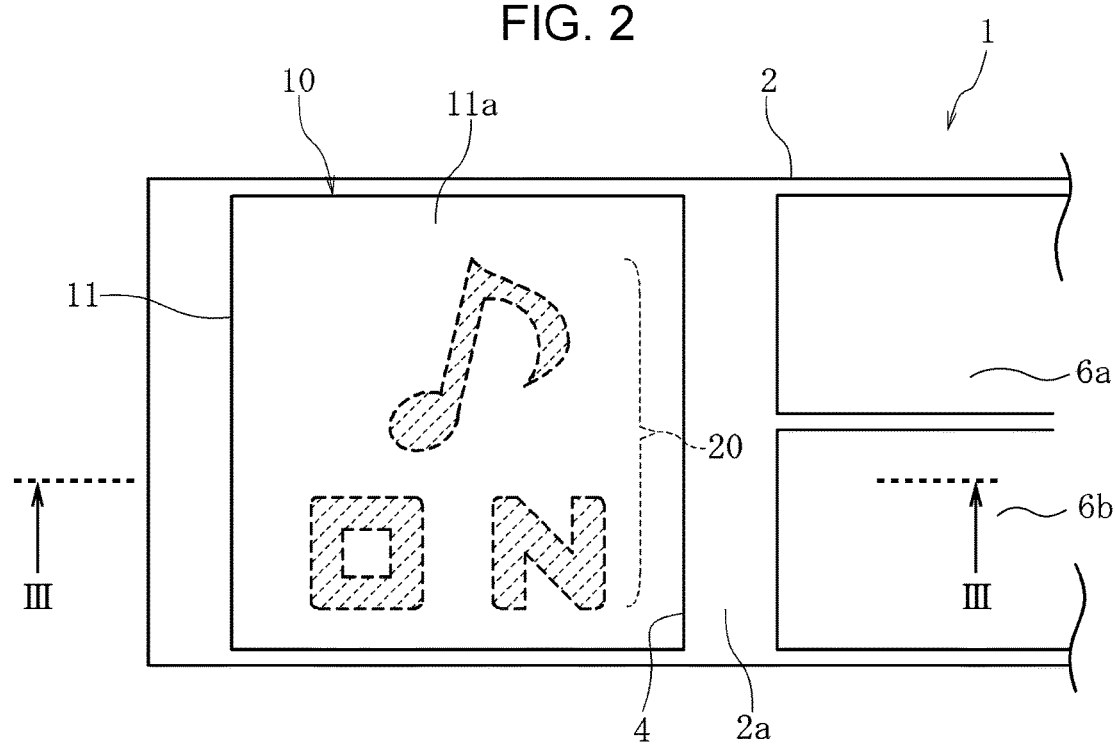
FIG. 2 is a front view showing a part of the decoration panel and the operation device shown in FIG. 1.
Figure 3:
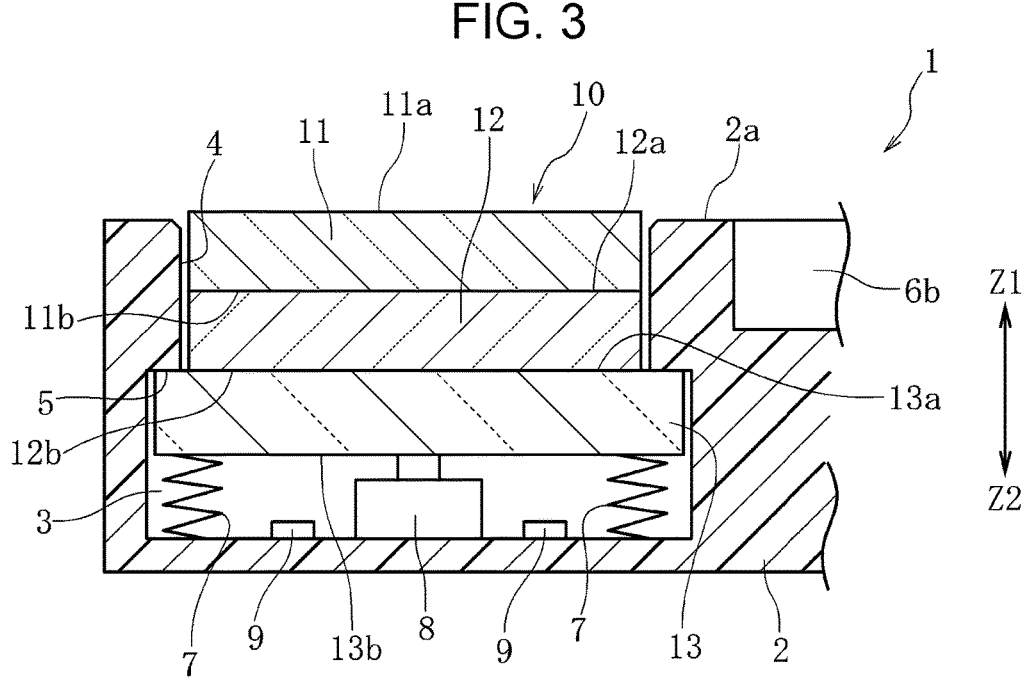
FIG. 3 is a cross-sectional view of the decoration panel and the operation device, taken along a line III-III in FIG. 2.

FIG. 1 to FIG. 3 illustrate an operation device 1. A decoration panel 10 according to a first embodiment of the present disclosure is incorporated in the operation device 1.

The operation device 1 may be used as operation device for vehicles, airplanes, home electric appliances, industrial machines, and so forth. The decoration panel 10 serves as a press button for activating a switch mechanism 8 in the operation device 1. However, the decoration panel may be used merely as a decorative display unit, without the operational function.

In FIG. 1 and some other drawings, a Z1 direction denotes the frontside of the operation device 1, and a Z2 direction denotes the rear side. The operation device 1 includes a support body 2 formed of a synthetic resin material. The surface of the support body 2 oriented to the front side (Z1 direction) serves as an operation surface 2a. When used in a vehicle, the operation device 1 is embedded in an instrument panel or dashboard provided in the vehicle interior, with the operation surface 2a exposed to the vehicle interior.

As shown in FIG. 3, the support body 2 includes thereinside a detection space 3 located on the rear side and a sliding space 4 communicating with the detection space 3 on the front side, and a stepped portion 5 is formed so as to define the boundary between the detection space 3 and the sliding space 4. The decoration panel 10 according to the first embodiment is located in the sliding space 4, so as to be pressed in the Z2 direction. As shown in FIG. 1 and FIG. 2, operation tools 6a and 6b are provided in the operation surface 2a of the support body 2. The operation tools 6a and 6b can also be pressed.

Figure 4:
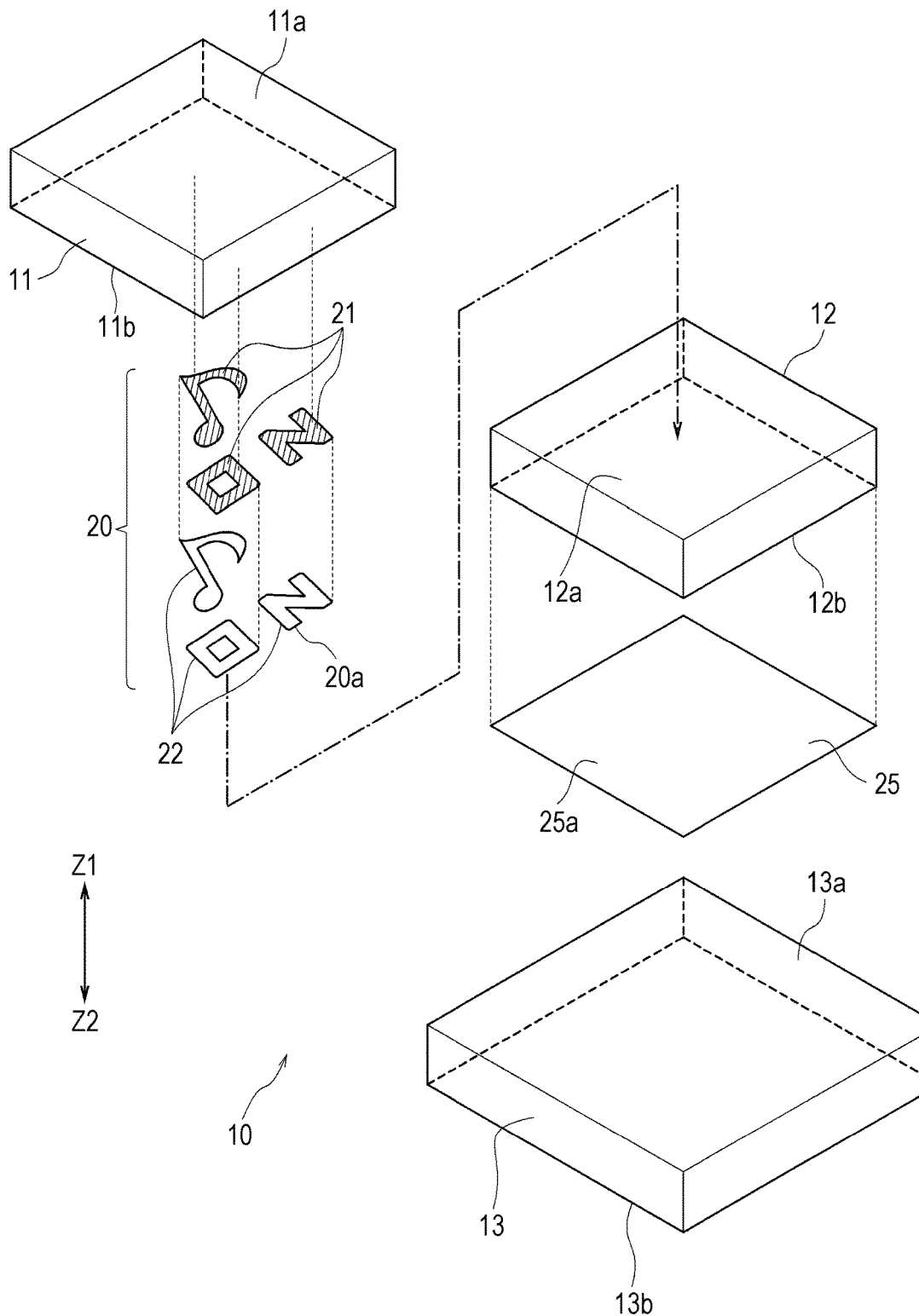
FIG. 4 is an exploded perspective view showing the components of the decoration panel.
Figure 5:
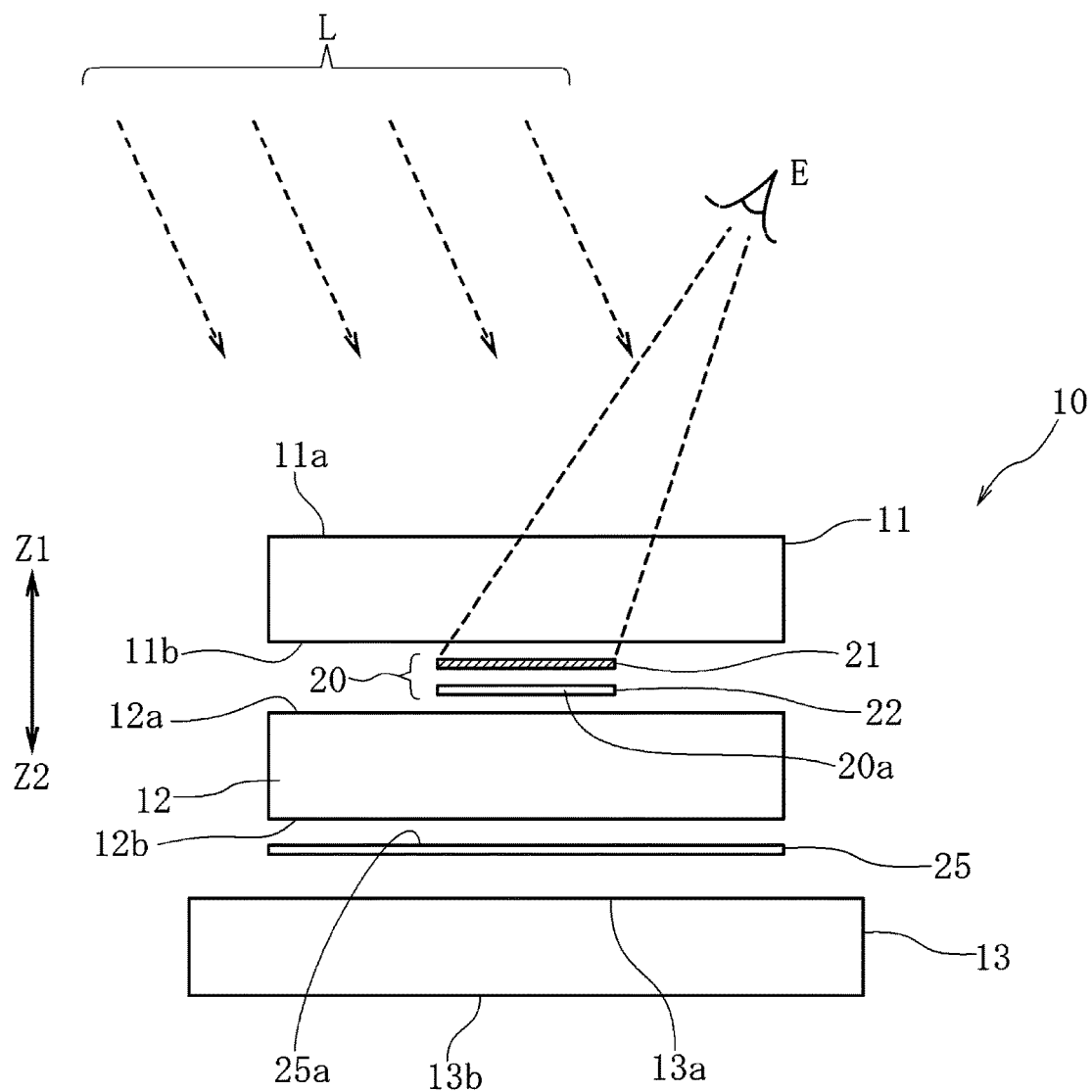
FIG. 5 is a side view for explaining the decorative effect of the decoration panel according to the first embodiment, in which the components are spaced from each other in a front-back direction, for the sake of clarity.

As shown in FIG. 3, FIG. 4, and FIG. 5, the decoration panel 10 includes a front translucent member 11 located on the front side (Z1 direction), a rear translucent member 12 stacked on the rear face of the front translucent member 11, and a translucent member 13 for illumination, stacked on the rear face of the rear translucent member 12. The front translucent member 11 and the rear translucent member 12 are both formed of a translucent resin, such as a polycarbonate resin or an acrylic resin. The front translucent member 11 and the rear translucent member 12 are formed of an uncolored transparent resin, the total light transmittance of which is not lower than 80%. Alternatively, at least one of the front translucent member 11 and the rear translucent member 12 may be colored in a chromatic color such as red, blue, or green, with the total light transmittance not lower than 50%, or not lower than 60%.

The translucent member 13 for illumination is also formed of a translucent resin such as a polycarbonate resin or an acrylic resin. The translucent member 13 contains, for example, a white filler, so as to cause diffused reflection of light inside the translucent member 13. The front translucent member 11, the rear translucent member 12, and the translucent member 13 for illumination are bonded to each other via an optical adhesive.

As shown in FIG. 3, a return spring 7 is provided in the detection space 3 of the support body 2, so as to bias the decoration panel 10 toward the front side (Z1 direction). In the decoration panel 10, the boundary between the rear translucent member 12 and the translucent member 13 for illumination is pressed against the stepped portion 5, to prevent the rear translucent member 12 and the translucent member 13 from coming off to the front side (Z1 direction). The detection space 3 includes the switch mechanism 8, to be activated when the decoration panel 10 is pressed in the Z2 direction. The detection space 3 also includes a light source 9 such as an LED, to provide an illumination light from the light source 9 to the translucent member 13 for illumination, when necessary. The illumination device 13 and the light source 9 constitute the illumination unit in the present disclosure.

FIG. 4 is an exploded perspective view of the decoration panel 10, and FIG. 5 is a side view of the decoration panel 10. In FIG. 5, the translucent members 11, 12, and 13 are spaced from each other in the front-back direction, for the sake of clarity.

The front translucent member 11 is a hexahedron, including a front face 11a oriented to the front side (Z1 direction), and a rear face 11b oriented to the rear side (Z2 direction). The rear face 11b is a flat surface orthogonal to the front-back direction (Z1-Z2 direction). Although the front face 11a is a flat surface in the mentioned drawings, the front face 11a may be a convex curved surface, the central portion of which protrudes to the front side. The rear translucent member 12 is also a hexahedron, including a front face 12a oriented to the front side (Z1 direction), and a rear face 12b oriented to the rear side (Z2 direction). The front face 12a and the rear face 12b are flat surfaces orthogonal to the front-back direction (Z1-Z2 direction). Here, the front translucent member 11 and the rear translucent member 12 may have, for example, a circular disk shape.

As shown in FIG. 4 and FIG. 5, a decoration section 20 is provided between the front translucent member 11 and the rear translucent member 12. The decoration section 20 is formed in close contact with the rear face 11b of the front translucent member 11, or with the front face 12a of the rear translucent member 12.

The translucent member 13 for illumination is a hexahedron slightly larger in plan-view shape than the rear translucent member 12, and includes a front face 13a oriented to the front side (Z1 direction), and a rear face 13b oriented to the rear side (Z2 direction). The front face 13a and the rear face 13b are flat surfaces orthogonal to the front-back direction (Z1-Z2 direction).

As shown in FIG. 4 and FIG. 5, a rear reflection layer 25 is formed between the rear face 12b of the rear translucent member 12 and the front face 13a of the translucent member 13 for illumination. The rear reflection layer 25 is formed in close contact with the rear face 12b of the rear translucent member 12, or with the front face 13a of the translucent member 13 for illumination. The surface of the rear reflection layer 25 oriented to the front side (Z1 direction) constitutes a rear reflection surface 25a having an area corresponding to substantially the entire area of the rear face 12a of the rear translucent member 12.

The rear reflection layer 25 is formed of a vapor deposition film of a metal such as silver, aluminum, tin, nickel, or titanium, and the rear reflection surface 25a is formed as a mirror reflection surface. In addition, the rear reflection layer 25 is set up so as to act as a half mirror, by adjusting the thickness of the metal deposition film and the metal density. Forming the rear reflection layer 25 as a half mirror allows the rear reflection surface 25a of the rear reflection layer 25 to be visually recognized as a metal reflection surface, when the decoration panel 10 is viewed from the front side, and also allows, when the light source 9 is turned on, the illuminated state to be visually recognized from the front side, because the illumination light from the light source 9 is transmitted through the rear reflection surface 25a, after being diffusedly reflected inside the translucent member 13.

As shown in FIG. 4 and FIG. 5, the decoration section 20 includes a light-shield layer 21 located on the front side, and a counter reflection layer 22 superposed on the rear face of the light-shield layer 21. Accordingly, the surface of the decoration section 20 oriented to the rear side (Z2 direction) constitutes the counter reflection surface 20a. The counter reflection layer 22 is formed of a vapor deposition film of a metal such as silver, aluminum, tin, nickel, or titanium, and the counter reflection surface 20a is formed as a mirror reflection surface. It is preferable that the counter reflection layer 22 presents a metal color of the same hue as that of the rear reflection layer 25, and more preferably, the counter reflection layer 22 and the rear reflection layer 25 may be formed through vapor deposition of the same material. Forming the counter reflection layer 22 and the rear reflection layer 25 from the same material and through the same process makes the counter reflection surface 20a the same half mirror surface, as the rear reflection surface 25a.

Alternatively, the counter reflection layer 22 and the rear reflection layer 25 may be formed by printing, with a metal-color ink.

Whereas the rear reflection surface 25a and the counter reflection surface 20a are mirror reflection surfaces, the term "mirror reflection surface" used herein refers to a surface where at least a part thereof causes mirror reflection or specular reflection, and at least a part of light that has reached the mirror reflection surface makes specular reflection, such that the incident angle and the reflection angle are the same. Although it is preferable that the rear reflection surface 25a and the counter reflection surface 20a have a specular reflection function of 100%, not to allow a diffused reflection function, these surfaces may partially allow the diffused reflection in this embodiment, provided that the specular reflection function is predominant.

The light-shield layer 21 of the decoration section 20 is formed by printing with an ink of a chromatic color such as black, green, or red. Regarding the light-shielding performance of the light-shield layer 21, it is not always necessary that the total light transmittance is zero, and a certain amount of light may be transmitted through the light-shield layer 21. However, it is preferable that the light-shield layer 21 is lower in light transmittance than the rear reflection layer 25, with respect to the illumination light emitted from the light source 9.

In the decoration panel 10 according to first embodiment, the light-shield layer 21 of the decoration section 20 and the counter reflection layer 22 have the same shape and size, such that these layers are superposed without protruding from each other. The decoration section 20 exhibits characters and patterns or marks. In the first embodiment, the decoration section 20 exhibits the characters of ON, and a tone mark.

Hereafter, the decorative effect, attained when the decoration panel 10 is viewed from the front side, will be described.

When the light source 9 shown in FIG. 3 is off, a light (L) from outside enters into the front translucent member 11 and the rear translucent member 12 of the decoration panel 10, and is reflected (substantially specular reflection) by the rear reflection surface 25a on the rear side of the rear translucent member 12, as shown in FIG. 5. The light reflected by the rear reflection surface 25a is transmitted through the decoration section 20, and is recognized by an eye (E) of an operator. As result, the light-shield layer 21 of the decoration section 20 looks as if it is floating at an intermediate position in the depth direction (front-back direction) of the decoration panel 10. In addition, since the rear reflection surface 25a is provided in the inner side of the decoration panel 10, the decoration panel 10 itself also appears to be deep.

The surface of the decoration section 20 oriented to the rear side (Z2 direction) serves as the counter reflection surface 20a, which is a mirror reflection surface formed of a metal film of a similar color to that of the rear reflection surface 25a. Accordingly, the shape of the decoration section 20 is restricted from being reflected in the rear reflection surface 25a, or reflected only to a negligible level, even though the shape is reflected at all. Therefore, the shape of the decoration section 20 is prevented from being viewed as double vision, in other words, as images shifted from each other in the front-back direction, when the decoration panel 10 is viewed at an oblique angle from the front side. Thus, the decoration section 20 can be seen clearly, and the decoration panel 10 can be visually recognized as a three-dimensional image as a whole.

When the light source 9 is turned on, for example at night, the illumination light from the light source 9 enters the translucent member 13 for illumination, and is diffusedly reflected inside the translucent member 13, so that the illumination light is evenly distributed to the rear translucent member 12. The illumination light is transmitted through the rear reflection layer 25, which is a half mirror, and recognized by the eye (E) of the operator, through the decoration section 20 on the front side. The entirety of the decoration panel 10 is illuminated with the illumination light, and further the decoration section 20 appears brightly, as if floating in the intermediate position in the depth direction of the decoration panel 10. Although the illumination light from the light source 9 reaches the decoration section 20 through the rear reflection layer 25, the decoration section 20 is restricted from being reflected in the rear reflection surface 25a, since the surface of the decoration section 20 oriented to the rear side serves as the counter reflection surface 20a. Therefore, also when the decoration panel 10 is illuminated, the decoration section 20 is prevented from being viewed as double vision. Consequently, the decoration section 20 can be seen clearly, and the decoration panel 10 can be visually recognized as a three-dimensional image as a whole.

Figure 6:
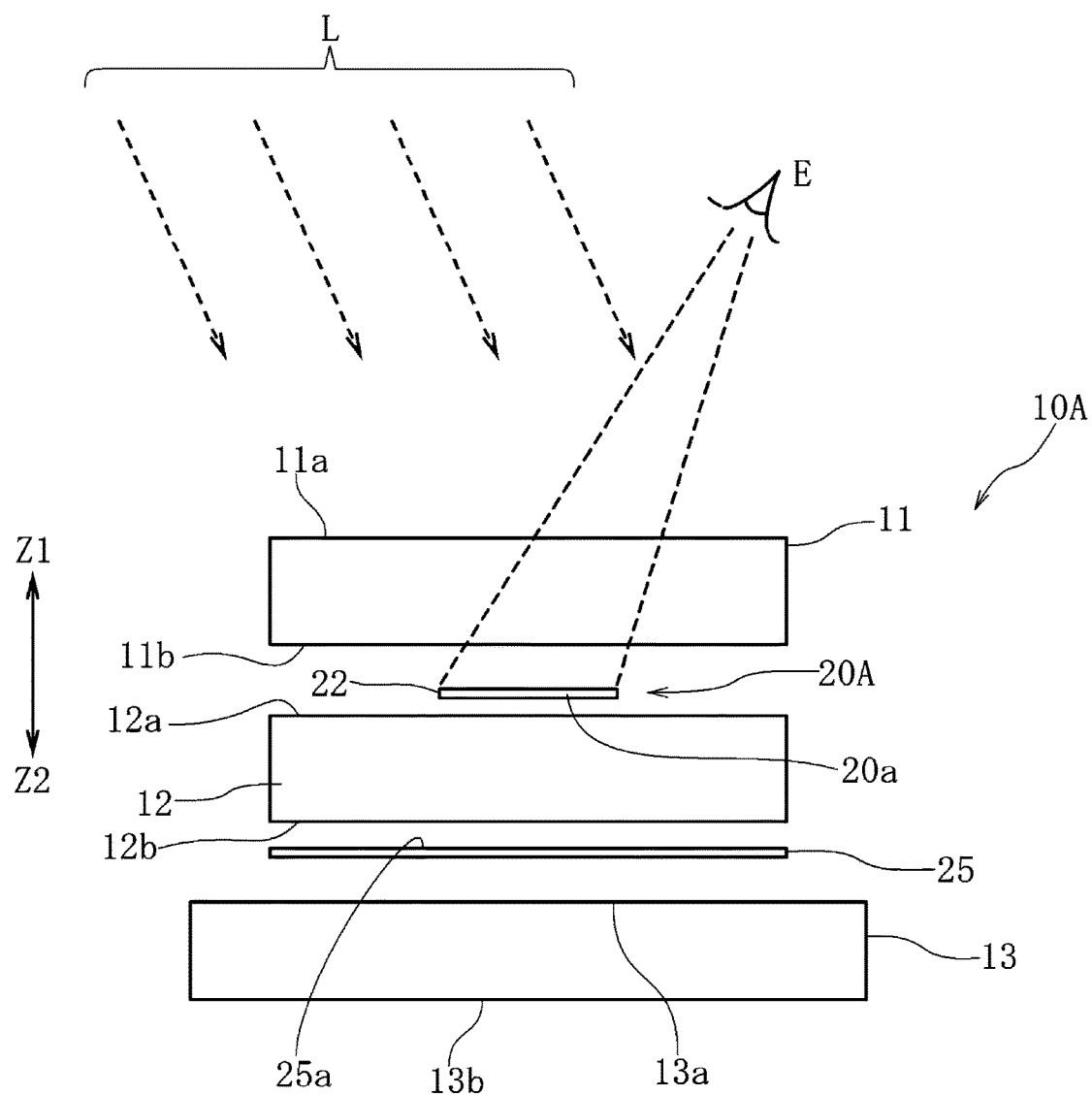
FIG. 6 is a side view for explaining the decorative effect of a decoration panel according to a variation of the first embodiment, in which the components are spaced from each other in a front-back direction, for the sake of clarity.

FIG. 6 illustrates a decoration panel 10A, which is a variation of the first embodiment of the present disclosure.

In the decoration panel 10A, although a decoration section 20A is provided between the front translucent member 11 and the rear translucent member 12, the decoration section 20A is only formed of a single layer, which is the counter reflection layer 22. Preferably, the counter reflection layer 22 and the rear reflection layer 25 may be formed through vapor deposition of the same metal, to present the metal surface of the same hue. The counter reflection layer 22 is formed as a half mirror layer like the rear reflection layer 25, serving as both the mirror reflection surface and the half mirror surface.

When the decoration section 20A is only formed of the counter reflection layer 22, the characters and patterns or marks of a metal color appear as if floating at the intermediate position in the depth direction (front-back direction) of the decoration panel 10A, to the eye (E) of the operator. In addition, since the counter reflection layer 22 includes the counter reflection surface 20a, the shape of the decoration section 20A is restricted from being reflected in the rear reflection surface 25a. Further, when the counter reflection layer 22 in the decoration section 20A is formed as a half mirror, the illumination light is transmitted through the rear reflection layer 25, and also through the counter reflection layer 22 of the decoration section 20A, when the light source 9 is turned on. Therefore, the characters and patterns or marks exhibited in the decoration section 20A present shining images at the intermediate position in the depth direction of the decoration panel 10A, to the eye (E) of the operator.

Figure 7:
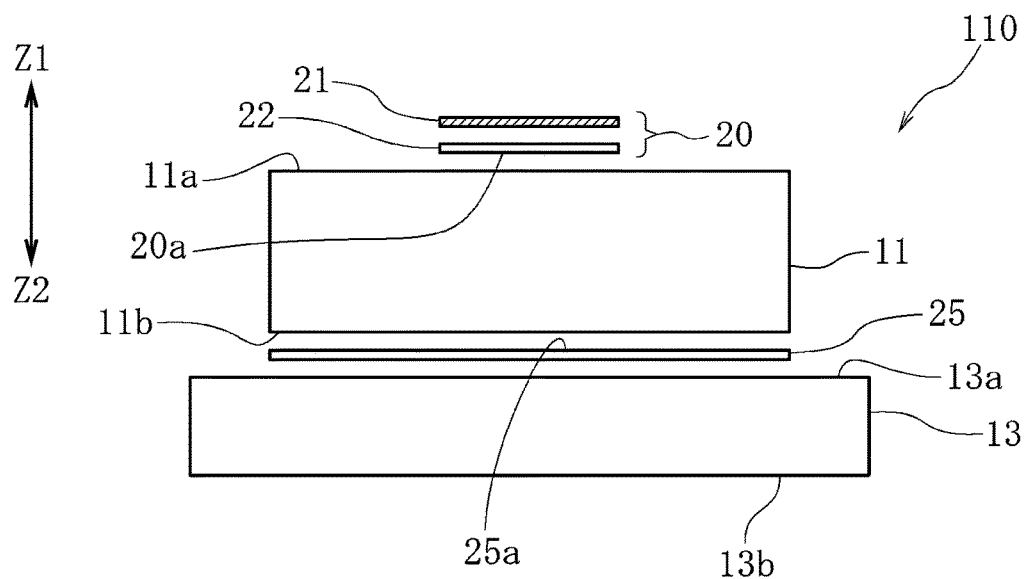
FIG. 7 is a side view for explaining the decorative effect of a decoration panel according to a second embodiment of the present disclosure, in which the components are spaced from each other in a front-back direction, for the sake of clarity.

FIG. 7 illustrates a decoration panel 110 according to a second embodiment of the present disclosure.

The decoration panel 110 includes the front translucent member 11, and the translucent member 13 for illumination, bonded to the rear side of the front translucent member 11. The decoration section 20 is provided in close contact with the front face 11a of the front translucent member 11. The decoration section 20 is formed by printing the light-shield layer 21 over the front face of the counter reflection layer 22, formed by vapor deposition on the front face 11a. Here, the decoration section 20 may be only formed of the counter reflection layer 22. The rear reflection layer 25 is formed by vapor deposition on the rear face 11b of the front translucent member 11, or the front face 13a of the translucent member 13 for illumination.

Although the decoration section 20 is located at the forefront position of the decoration panel 110, the front translucent member 11 has a sufficient thickness in the front-back direction (Z1-Z2 direction), and the rear reflection surface 25a is provided on the rear side. Therefore, a three-dimensional image extending in the depth direction can be presented to the eye (E) of the operator. In addition, the characters and patterns or marks exhibited in the decoration section 20 can be prevented from being reflected in the rear reflection surface 25a.

Figure 8:
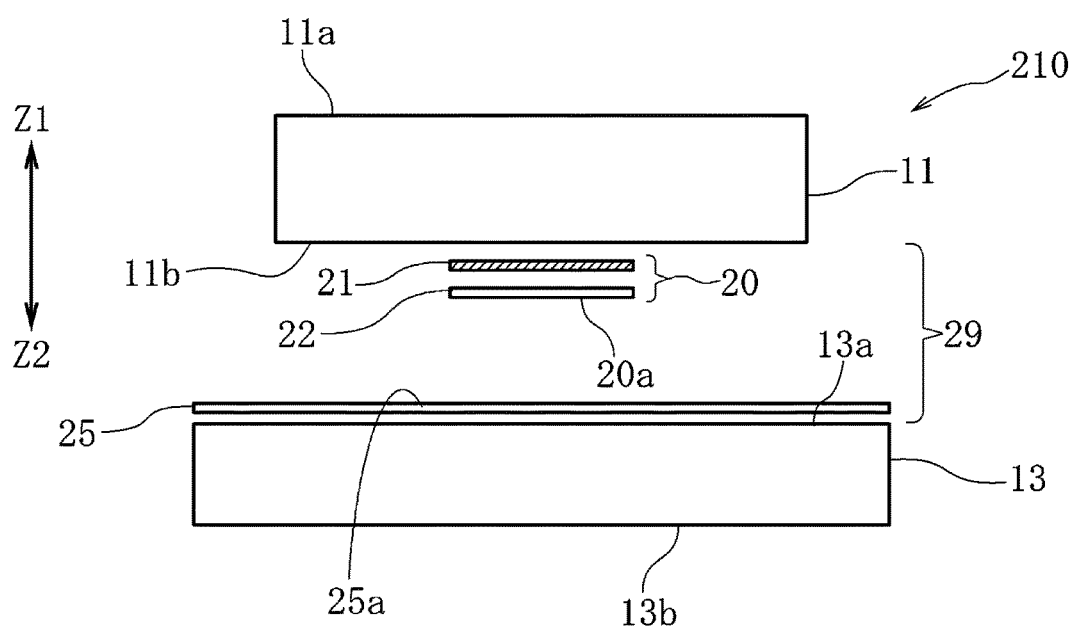
FIG. 8 is a side view for explaining the decorative effect of a decoration panel according to a third embodiment of the present disclosure, in which the components are spaced from each other in a front-back direction, for the sake of clarity.

FIG. 8 illustrates a decoration panel 210 according to a third embodiment of the present disclosure.

In the decoration panel 210, the decoration section 20 is provided in close contact with the rear face 11b of the front translucent member 11. The decoration section 20 is formed by vapor deposition of the counter reflection layer 22 over the rear face of the light-shield layer 21, which is formed by printing. Here, the decoration section 20 may be only formed of the counter reflection layer 22. With reference to the support body 2 of the operation device 1 shown in FIG. 1, only the front translucent member 11 is supported so as to move in the front-back direction (Z1-Z2 direction), so that the front translucent member 11 serves as the press button. Thus, the switch mechanism 8 can be activated by the front translucent member 11.

A space 29 is provided on the rear side (Z2 direction) of the front translucent member 11, and the translucent member 13 for illumination is fixed opposite the front translucent member 11, across the space 29. The rear reflection layer 25 is formed by vapor deposition over the front face 13a of the translucent member 13, and the front face of the rear reflection layer 25 constitutes the rear reflection surface 25a. In addition, the light source 9 is provided on the rear side of the translucent member 13.

Also in the decoration panel 210 shown in FIG. 8, the decoration section 20 appears as if floating at the intermediate position in the depth direction (front-back direction). In addition, since the rear face of the decoration section 20 serves as the counter reflection surface 20a, the characters and patterns or marks exhibited in the decoration section 20 can be prevented from being reflected in the rear reflection surface 25a.

Figure 9:
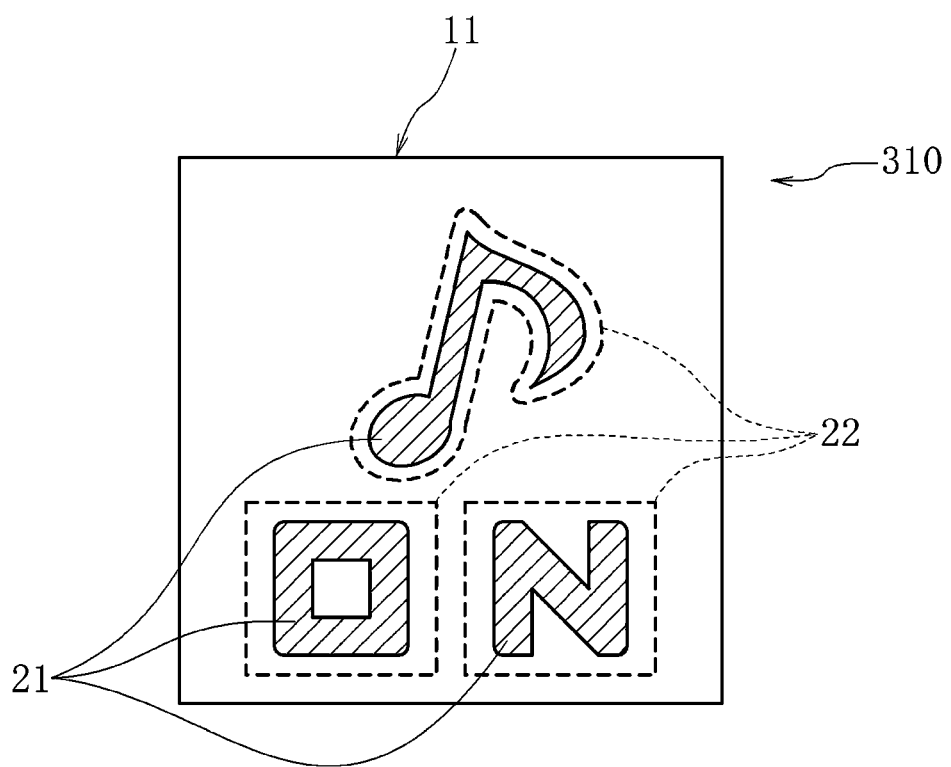
FIG. 9 is an enlarged front view showing a variation of a relation between a light-shield layer and a counter reflection layer, constituting a decoration section.

FIG. 9 is a front view of a decoration panel 310, configured as a variation of the foregoing embodiments.

In the decoration section 20 according to the foregoing embodiments, the light-shield layer 21 and the counter reflection layer 22 are formed as the same shape and size, and superposed on each other, as shown in FIG. 4. In the variation shown in FIG. 9, in contrast, the counter reflection layer 22 is larger in area than the light-shield layer 21, and the counter reflection layer 22 protrudes outward from the periphery of the light-shield layer 21. With such a configuration, the counter reflection layer 22 of a metal color appears along the periphery of the light-shield layer 21 representing the characters and patterns or marks, when viewed with the eye (E) of the operator from the front side.

The present disclosure is not limited to the foregoing embodiments and variations thereof, but may be further modified, for example as follows.

In each of the embodiments, the front translucent member 11 may include a pair of translucent members divided in the front-back direction, which are bonded to each other with the decoration section 20 interposed therebetween, so as to constitute the front translucent member 11.

In the embodiment shown in FIG. 8, the decoration section 20 may be formed in close contact with the front face 11a of the front translucent member 11.

Further, the counter reflection layer 22 and the rear reflection layer 25 may be formed of a metal layer of a chromatic color.

What is claimed is:

1. A decoration panel comprising:
a front translucent member formed of a translucent material and located on a front side;
a decoration section formed on a rear side or a front side of the front translucent member; and
a rear reflection surface located in the rear of the decoration section having a distance therefrom,
wherein a surface of the decoration section facing toward the rear reflection surface constitutes a counter reflection surface, and,
wherein the rear reflection surface and the counter reflection surface are mirror reflection surfaces.

2. The decoration panel according to claim 1,
wherein a rear translucent member formed of a translucent material is stacked on a rear face of the front translucent member, and the rear reflection surface is provided on a rear face of the rear translucent member.

3. The decoration panel according to claim 1,
wherein a space is provided between the rear face of the front translucent member and the rear reflection surface.

4. The decoration panel according to claim 2,
wherein the decoration section is provided on the rear face of the front translucent member.

5. The decoration panel according to claim 1,
wherein the decoration section is provided on a front face of the front translucent member, and the rear reflection surface is provided on the rear face of the front translucent member.

6. The decoration panel according to claim 1,
wherein the decoration section includes a light-shield layer and a counter reflection layer superposed on a rear side of the light-shield layer, and the counter reflection surface is formed in the counter reflection layer.

7. The decoration panel according to claim 6,
wherein the light-shield layer and the counter reflection layer superposed on the rear side of the light-shield layer are the same in plan-view shape and in size.

8. The decoration panel according to claim 6,
wherein the counter reflection surface superposed on the rear side of the light-shield layer is larger in area than the light-shield layer.

9. The decoration panel according to claim 1,
wherein the decoration section only includes a counter reflection layer, and the counter reflection surface is formed in the counter reflection layer.

10. The decoration panel according to claim 1,
wherein the rear reflection surface is a half mirror, and,
the decoration panel further comprises an illumination unit configured to provide an illumination light to the half mirror, from the rear side.

11. The decoration panel according to claim 1, further comprising a switch mechanism configured to be activated when the front translucent member is pressed.

* * * * *